United States Patent [19]

van Dreumel

[11] Patent Number: 5,536,344
[45] Date of Patent: Jul. 16, 1996

[54] METHOD OF INSTALLING A PLASTIC COMPOSITE FASTENER IN A PANEL

[75] Inventor: Willem H. M. van Dreumel, JD Nijverdal, Netherlands

[73] Assignee: Shur-Lok Corporation, Irvine, Calif.

[21] Appl. No.: 305,165

[22] Filed: Sep. 13, 1994

[51] Int. Cl.⁶ .................................................. B29C 65/06
[52] U.S. Cl. .......................... 156/73.5; 156/257; 156/293; 264/68
[58] Field of Search ................................ 156/73.5, 73.6, 156/91, 92, 250, 252, 253, 256, 257, 290, 292, 293, 308.4, 580, 580.2; 228/2.3, 114.5; 264/248, 68

[56] References Cited

U.S. PATENT DOCUMENTS

| | | | |
|---|---|---|---|
| 2,942,748 | 6/1960 | Anderson | 228/114.5 X |
| 3,477,115 | 11/1969 | Martin et al. | 228/114.5 |
| 3,510,916 | 5/1970 | Phelan | 425/110 |
| 3,547,741 | 12/1970 | Hewitt | 156/582 X |
| 3,580,793 | 5/1971 | Hewitt | 156/73.5 X |
| 3,897,897 | 8/1975 | Satzler et al. | 228/2.3 |
| 4,427,471 | 1/1984 | Chierici | 156/73.5 |
| 4,846,612 | 7/1989 | Worthing | 411/82 |
| 4,865,792 | 9/1989 | Moyer | 264/249 |
| 5,338,594 | 8/1994 | Wang et al. | 428/117 |
| 5,437,750 | 8/1995 | Rinse et al. | 156/73.1 |

Primary Examiner—David A. Simmons
Assistant Examiner—J. Sells
Attorney, Agent, or Firm—Price, Gess & Ubell

[57] ABSTRACT

A method of installing a thermoplastic fastener insert unit into a thermoplastic composite resin panel includes the steps of cutting a hole in the plastic resin panel of a diameter less than the annular flange of the fastener insert unit. The fastener insert unit is then rotated to frictionally generate heat between the annular flange and the plastic resin panel until sufficient heat has been generated to enable the welding of a fastener insert unit directly to the plastic resin panel. Additionally, the lower surface of the fastener insert unit can also be frictionally welded to an interior surface of the plastic resin panel.

13 Claims, 2 Drawing Sheets

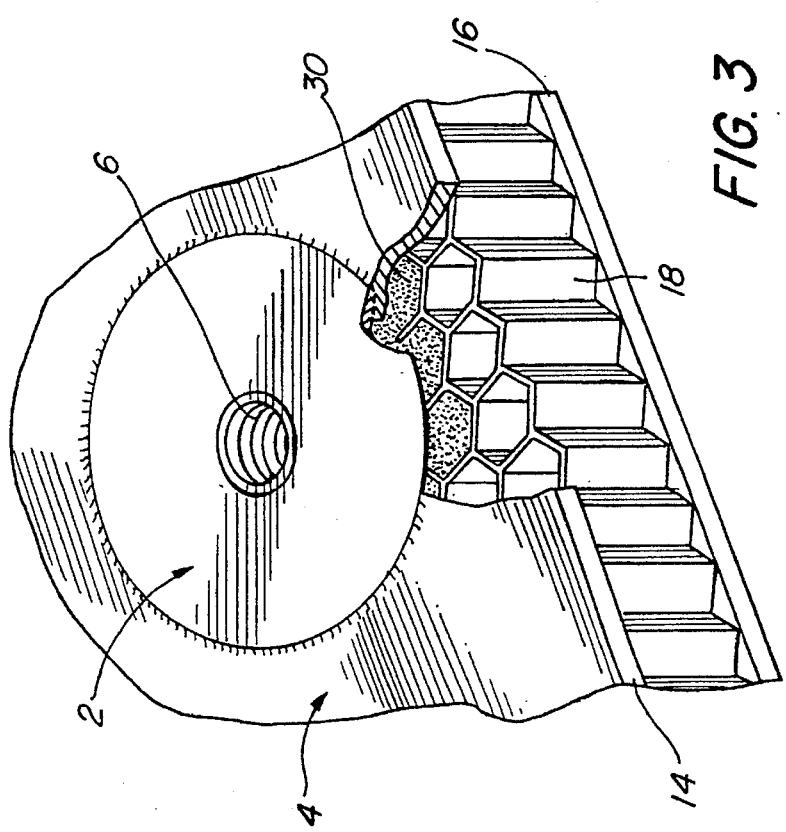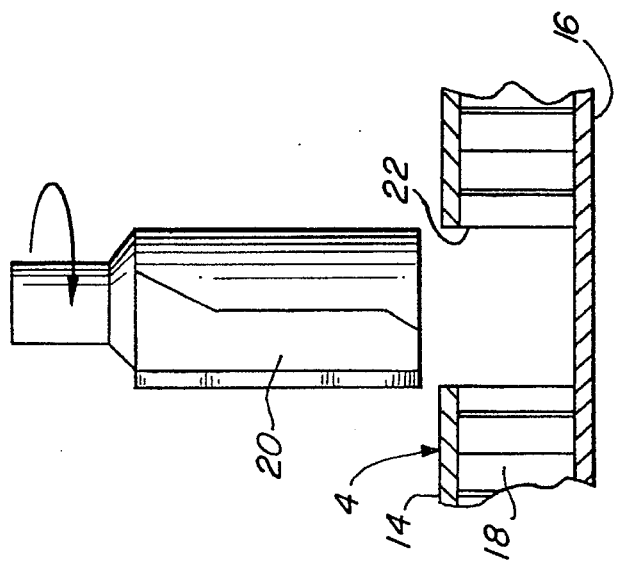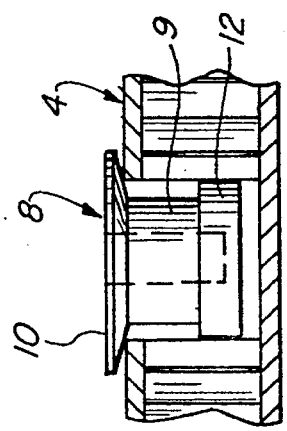

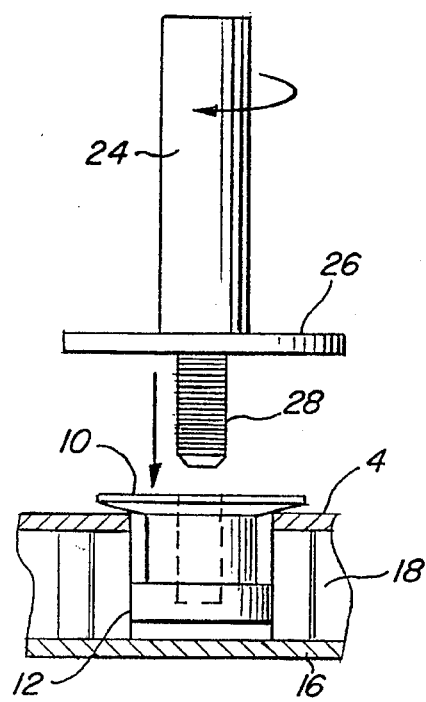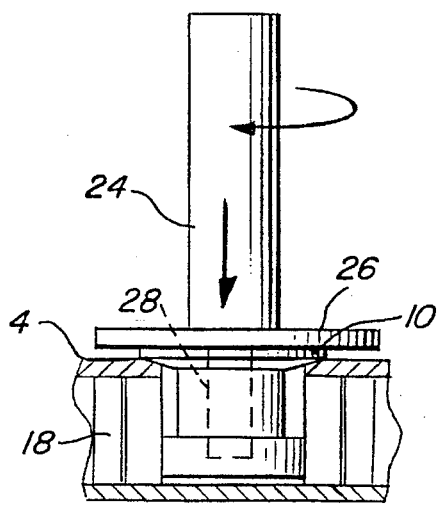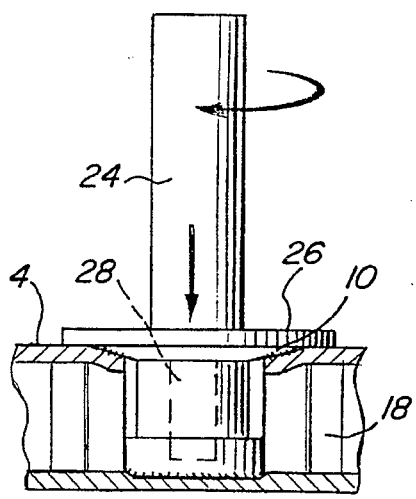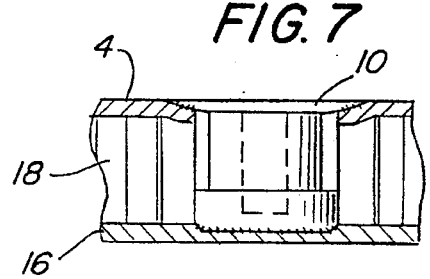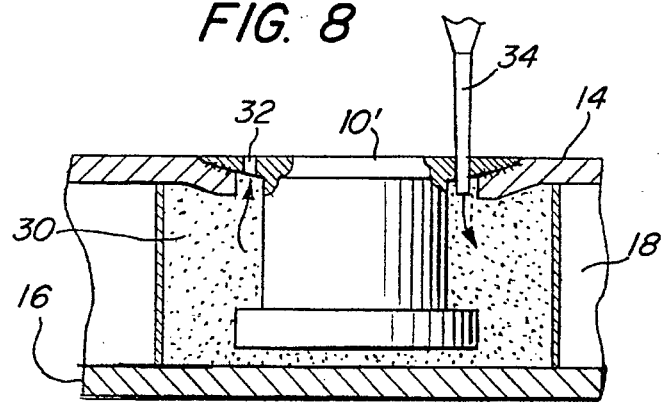

1

METHOD OF INSTALLING A PLASTIC COMPOSITE FASTENER IN A PANEL

BACKGROUND OF THE INVENTION

1. Field of the Invention

The present invention relates to a method of installing fasteners in sandwich-type composite panels and more particularly, a method of integrally welding a fastener insert into a sandwich-type panel.

2. Description of Related Art

Lightweight structural panels are commonly formed of a sandwich of two flat resin facings and an intermediate core structure which are bonded together and are frequently used as flooring, bulkheads, and the like in commercial aircraft. Such sandwich panels possess a desirous characteristic of being lightweight, while still providing relative high strength and stiffness needed for structural support in the aircraft.

Various forms of fasteners have been developed to be secured in a hole that has been cut into the aircraft panel, such as the sandwich panel fastener of U.S. Pat. Nos. 3,510,916 and 4,846,612. Sandwich panels can utilize an exterior sheet or skin, such as a glass fiber reinforced polyetherimide, which is then adhered by an adhesive to a core structure. The core structure can be a plurality of strips of metal foil or other thin lightweight material, which have been bent to form a plurality of honeycomb cells. The opposite side of the core structure is adhered to a similar resin sheet to form a sandwich configuration.

The fastener insert can be installed in a lightweight sandwich panel by first drilling a hole of the desired size for the particular insert. The insert is then inserted within the hole and is usually secured by a potting compound that will harden to provide an anchorage for the insert. Various different methods have been resorted to in an attempt to position the insert into the hole and to hold it in the proper position, while permitting the potting compound to be introduced into the core structure and to set to hold the fastener in its appropriately aligned position. An adhesive cover has been utilized to temporarily attach itself to the periphery of the panel, while holding the insert adjacent the panel surface to receive the potting compound. The adhesive cover is subsequently removed when the insert has been appropriately anchored.

The prior art is still seeking to optimize the manner of installing inserts in a lightweight panel structure and thereby realize a savings in labor cost.

OBJECTS AND SUMMARY OF THE INVENTION

The present invention provides an improved method of installing a fastener insert unit into a plastic resin panel. A hole is cut into a plastic resin panel of a size to receive the body of a fastener insert unit. The fastener insert unit has an upper compatible resin annular flange extending from an insert body of a dimension greater than the hole. The fastener insert unit with the flange is then rotated to frictionally generate heat between the annular flange and the upper exterior sheet or skin of the sandwich panel surrounding the hole. Sufficient heat is generated to weld the annular flange to the plastic resin panel by softening the respective plastic resins so that they adhere to each other when cooled. Additionally, the lower bottom surface of the insert can be formed from a thermoplastic material and, if properly dimensioned, it will also come into contact with a lower interior surface of a sheet or skin of the sandwich panel and can therefore also weld the lower skin to the bottom of the fastener insert unit. If desired, the welded connection of the thermoplastic fastener insert unit with the sandwich panel can be supplemented with potting material to further anchor the fastener insert unit.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a fastener insert unit that has been installed into a sandwich panel;

FIG. 2 is a cross-sectional view showing the application of a rotatable tool bit to the sandwich panel to cut a hole;

FIG. 3 is a cross-sectional view with a fastener insert unit positioned in the panel hole;

FIG. 4 is a cross-sectional view of applying a rotatable tool bit to the fastener insert unit;

FIG. 5 shows the rotation of the insert to generate frictional heat with the exterior surface of the sandwich panel;

FIG. 6 shows the deformation and welding of the fastener insert unit into the upper surface of the sandwich panel and also the lower sandwich panel interior surface;

FIG. 7 shows the fastener insert unit as welded to the sandwich panel; and

FIG. 8 shows an alternative fastener insert unit with potting material to provide a supplemental anchorage.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a method of installing a plastic composite fastener in a panel.

Referring to FIGS. 1–8, a thermoplastic fastener insert unit 2 is mounted in a lightweight composite panel 4 as a result of the method of the present invention. The fastener insert unit 2 is formed of a thermoplastic material, such as a polyetherimide and can have a steel threaded core 6 which has been surrounded by a plastic body 8. The plastic body has an upper enlarged annular flange 10 and a lower cylindrical base portion 12. The plastic body 4 has an intermediate reduced diameter portion 9. The annular flange 10 can have one or more holes extending through the flange 10 to permit the injection of potting material into the composite material 4 and preferably the holes are within the outer diameter of the lower cylindrical base portion 12, as shown in the alternative embodiment of FIG. 8. The potting material 30 can then flow within the core of the composite panel and around the plastic body 8 to anchor the fastener insert unit when the plastic potting material 30 hardens.

The composite panel 4 can be a bonded sandwich panel comprising an outer skin or flat resin facing sheet 14 and a lower flat facing resin sheet or skin 16 that are, respectively, adhesively bonded to a core, for example, thin metal ribbing bent to form honeycomb cells 18. The upper and lower resin skins can be further formed from plies of warp and weft dominated fabric, such as reinforced or unreinforced polyetherimides. Examples of such plastic laminates can be secured from Ten Cate Advanced Composites under the trademark "CETEX". Such panels are advantageously used in aircraft and other structures requiring a strong and lightweight structure. Other types of thermal plastic resins can be used if they can be heated to a melting condition by friction rotation.

The plastic body 8 of the fastener insert unit 4 can also be formed by molding of a polyetherimide resin, such as a resin sold by General Electric Co. under the trademark "ULTEM". This material has a melting temperature of about 217° Celsius with excellent surface hardness and mechanical properties. The thermal conductivity of such a plastic material is relatively low compared to metals so that any heat that is generated on a surface of the plastic is not easily transferred to the core of the insert part. As a result, the temperature of the surface layer will rise relative to the plastic body 8.

Referring to FIG. 2, a cutting tool 20, for example, of a high speed steel or carbide, is used to bore a hole of a predetermined diameter in the composite panel 4 at a desired location. The cutting tool can be controlled either manually or through automatic NC equipment. Ideally, the dimension of the thickness of the composite panel 4 is accurately matched with the height of the fastener insert unit 2 in the first embodiment to permit a thermal welding of both a flange and a base portion of the plastic body 8. The diameter of the bore 22 is slightly larger than the diameter of the cylindrical base portion 12 of the fastener insert unit 2. The annular flange 10 has a diameter greater than the bore 22 and is relatively thin compared to the plastic body 8.

Referring to FIG. 3, an appropriate fastener insert unit 2 is shown installed within the bore 22 of the composite panel 4.

Referring to FIG. 4, a rotatable tool bit 24 having an annular steel flange 26 with a threaded stud 28, compatible with the threaded stainless steel core 6, can be rotatably inserted into the fastener insert unit 2.

Referring to FIG. 5, the tool bit 24 is then rotated so that a frictional contact occurs between the annular flange 10 of the insert unit 2 and the upper exterior surface 14 of the composite panel 4. For example, the tool bit 24 can rotate at 400 to 600 rpm's for a time period of approximately 10 seconds to generate sufficient heat for an insert unit 2 with an annular flange of approximately 22.5 mm in diameter. A person skilled in the art can vary the speed and time to optimize these parameters for a particular insert and a particular plastic material.

During this rotation, the annular flange 10 will soften under the frictional heat as will the upper skin 14 of the composite panel 4. The respective polyetherimide plastic material will soften sufficiently so that it will flow together to, in essence, weld the fastener insert unit 2 directly to the upper skin 14. The upper skin 14 will also deflect in shape, as shown in FIG. 6 from the downward applied force of the tool bit 24 so that the insert flange 10 will be flush with the surface of the upper skin 14.

Since the height of the fastener insert unit 2 has been appropriately selected, the bottom planar surface of the cylindrical base portion 12 will also frictionally engage the interior surface of the lower skin 16 of the composite panel 4. Again, heat will be generated through the frictional contact sufficient to provide a weld between the cylindrical base portion 12 and the lower skin 16. When this weld has set, the rotatable tool bit 24 is removed, as shown in FIG. 7. As can be appreciated, an annular weld, as shown in FIG. 1, extends across the surface of the upper skin 14 and is interfaced with the annular flange 10 of the fastener insert unit 2. Also, a weld exists between the lower surface of the cylindrical base portion 12 and the lower skin 16. For some applications, these welds may be sufficient for securing the fastener insert unit 2 as mounted on the composite panel 4.

Appropriate holes 32 can be provided in the annular flange 10' to permit the insertion of a conventional potting material with a nozzle 34 to further anchor the fastener insert unit to the composite panel 4, as shown in the alternative embodiment of FIG. 8. In the embodiment of FIG. 8, the weld is only provided on the upper flange 10' since the height of the insert body does not extend to the lower panel 16. In some applications, such an upper weld will be sufficient without the addition of potting material to anchor the fastener insert. The provision of a potting material for anchoring an insert unit is well known and will not be further described herein.

As can be readily appreciated, a substantial labor saving procedure is provided wherein a thermoplastic fastener insert unit 2 can be securely mounted in a thermoplastic composite panel 4. Additional anchoring can be provided through the injection of a potting compound into the core and about the plastic body 8 of the fastener insert unit 2.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of installing a fastener insert unit in a plastic resin panel comprising:

providing a thermal plastic fastener insert unit having an annular flange;

cutting a hole in the plastic resin panel of a diameter less than the annular flange, an annular portion of the plastic resin panel being defined about the hole;

rotating the fastener insert unit to frictionally generate heat between the annular flange and the annular portion of the plastic resin panel;

applying a force so that a lower surface of the annular flange and the annular portion of the plastic resin panel in frictional contact with the annular flange will deflect in shape to enable an upper surface of the annular flange to be flush with a remaining portion of the plastic resin panel that was not in frictional contact; and fastening the fastener insert unit when sufficiently heated by welding it with the plastic resin panel.

2. The method of claim 1 further including simultaneously rotating a lower surface of the fastener insert unit against an upper surface of another lower plastic resin panel to generate heat and fastening the lower surface of the fastener insert to the lower surface of the plastic resin panel by welding them together.

3. The method of claim 1 further including inserting a potting compound into the plastic resin panel to further anchor the fastener insert unit.

4. A method of installing a fastener insert unit in a lightweight composite panel comprising the steps of:

providing a composite panel having an upper plastic resin panel, a lower parallel plastic resin panel and means for separating the two resin panels;

providing a plastic fastener insert unit having an annular flange and a lower base portion of a diameter smaller than the flange, the plastic material of the plastic resin panel and the plastic material of the plastic fastener insert being compatible to adhere to each other when heated above their melting points;

cutting a hole in the upper plastic resin panel of a diameter less than the upper annular flange and approximately the diameter of the base portion to permit the base portion to enter the separating means and to permit the upper annular flange to overlay an annular portion of the upper plastic resin panel;

rotating the fastener insert unit to frictionally generate heat between the upper annular flange and the annular portion of the upper plastic resin panel;

applying a force so that the upper annular flange and the annular portion of the upper plastic resin panel in frictional contact with the upper annular flange will deflect in shape to enable an upper surface of the upper annular flange to be flush with a remaining surface of the upper plastic resin panel; and fastening the fastener insert unit when sufficiently heated by welding the annular flange with the upper plastic resin panel.

5. The method of claim 4 further including simultaneously rotating a lower surface of the fastener insert unit against the lower plastic resin panel to generate heat and fastening the lower surface of the fastener insert to the lower plastic resin panel by welding them together.

6. The method of claim 4 further including inserting a potting compound into the plastic resin panel to further anchor the fastener insert unit.

7. A method of installing a fastener insert unit in a lightweight composite panel comprising the steps of:

providing a composite panel having an upper plastic resin panel of polyetherimide, a lower parallel plastic resin panel and means for separating the two resin panels;

providing a plastic fastener insert unit having an annular flange of polyetherimide;

cutting a hole in the upper plastic resin panel of a diameter less than the annular flange;

rotating the fastener insert unit to frictionally generate heat between the annular flange and an annular portion of the upper plastic resin panel;

applying a force so that a lower surface of the annular flange and the annular portion of the upper plastic resin panel in frictional contact with the annular flange will deflect in shape to enable an upper surface of the annular flange to be flush with a remaining portion of the upper plastic resin panel that was not in frictional contact; and fastening the fastener insert unit when sufficiently heated by welding the annular flange with the plastic resin panel.

8. The method of claim 1 wherein the thermal plastic fastener insert unit includes a steel threaded core and the fastener insert unit is rotated with a rotatable tool bit having an annular steel flange to apply a force and a threaded stud for releasably engaging the steel threaded core.

9. The method of claim 8 wherein the tool bit is rotated between 400 to 600 rpm for a period of approximately 10 seconds.

10. The method of claim 4 wherein the thermal plastic fastener insert unit includes a steel threaded core and the fastener insert unit is rotated with a rotatable tool bit having an annular steel flange to apply a force and a threaded stud for releasably engaging the steel threaded core.

11. The method of claim 10 wherein the tool bit is rotated between 400 to 600 rpm for a period of approximately 10 seconds.

12. The method of claim 7 wherein the thermal plastic fastener insert unit includes a steel threaded core and the fastener insert unit is rotated with a rotatable tool bit having an annular steel flange to supply a force and a threaded stud for releasably engaging the steel threaded core.

13. The method of claim 12 wherein the tool bit is rotated between 400 to 600 rpm for a period of approximately 10 seconds.

\* \* \* \* \*